United States Patent
Kitamura et al.

(12) 
(10) Patent No.: US 7,090,936 B2
(45) Date of Patent: Aug. 15, 2006

(54) MAGNETIC RECORDING MEDIUM

(75) Inventors: Kenichi Kitamura, Nagano (JP); Takayoshi Kuwajima, Saku (JP); Sadafumi Iijima, Yamanashi (JP)

(73) Assignee: TDK Corporation, Tokyo (JP)

( * ) Notice: Subject to any disclaimer, the term of this patent is extended or adjusted under 35 U.S.C. 154(b) by 371 days.

(21) Appl. No.: 10/397,845

(22) Filed: Mar. 27, 2003

(65) Prior Publication Data

US 2004/0005479 A1    Jan. 8, 2004

(30) Foreign Application Priority Data

Mar. 29, 2002    (JP) ............................. 2002-095638

(51) Int. Cl.
*G11B 5/738* (2006.01)

(52) U.S. Cl. ................................. 428/840.2; 428/840.4

(58) Field of Classification Search .......... 428/694 BS, 428/840.2, 840.4

See application file for complete search history.

(56) References Cited

FOREIGN PATENT DOCUMENTS

| JP | 55-017813 | * | 2/1980 |
|---|---|---|---|
| JP | 56-10688 A1 | | 3/1981 |
| JP | 57-4967 A1 | | 1/1982 |
| JP | 1-25136 A1 | | 5/1989 |
| JP | 10-334450 A1 | | 12/1998 |

* cited by examiner

*Primary Examiner*—Stevan A. Resan
(74) *Attorney, Agent, or Firm*—David T. Nikaido

(57) ABSTRACT

The present invention provides a high recording density magnetic recording medium with excellent surface smoothness, as well as excellent electromagnetic conversion characteristics and durability. A magnetic recording medium comprising a lower non-magnetic layer containing at least a non-magnetic powder and a binder resin on a non-magnetic support, and an upper magnetic layer with a thickness of 0.2 μm or less on said lower non-magnetic layer, wherein said lower non-magnetic layer contains an acicular powder of hydrated iron oxide as the non-magnetic powder, and said lower non-magnetic layer contains a fatty acid and a fatty acid amide. Preferably the acicular powder of hydrated iron oxide is goethite with an average long axial length of 0.15 μm or less.

5 Claims, No Drawings

MAGNETIC RECORDING MEDIUM

BACKGROUND OF THE INVENTION

1. Field of the Invention

The present invention relates to a magnetic recording medium, and more specifically to a high recording density magnetic recording medium with excellent surface smoothness, electromagnetic conversion characteristics and durability

2. Disclosure of the Related Art

In recent years, the magnetic recording media for digital recording to release from signal deterioration arising from repeated copying have become common. Furthermore, in order to cope with increases in recording data volumes, magnetic recording media with increased recording densities are required. In order to increase the recording density, factors such as media thickness loss and self-demagnetizing loss must be considered, and for these reasons, it is desired to reduce in the film thickness of the magnetic layer.

When the thickness of the magnetic layer is reduced, the surface roughness of the support is reflected on the surface of the magnetic layer, causing a loss of smoothness in the magnetic layer surface, and a deterioration of the electromagnetic conversion characteristics. Consequently, a non-magnetic layer is provided on the surface of the support as an undercoat layer, and the magnetic layer is then provided on the surface of this non-magnetic layer. As a result, the surface of this non-magnetic layer provided beneath the magnetic layer need to be formed with smooth, to obtain a magnetic layer with a smooth surface.

Furthermore, when the thickness of the magnetic layer is reduced, the quantity of lubricant that can be held within the magnetic layer decreases markedly. The addition of large quantities of lubricants to the magnetic layer undesirably results in such a problem as blooming, and a satisfactory level of durability cannot be achieved solely through the addition of the maximum quantity of lubricant which can be added to the magnetic layer.

Japanese Patent Publication No. Hei 1-25136 discloses the use of combinations of fatty acids, fatty acid esters and fatty acid amides as the lubricant for a magnetic layer on a support. However, even if a lubricant combination such as that disclosed in the above publication is applied to an extremely thin magnetic layer of 0.2 μm or less, the absolute quantity of lubricants that can be incorporated within the layer is insufficient due to remarkable thinness of the magnetic layer, and adequate levels of durability and reliability cannot be obtained. Furthermore, if the entire quantity of lubricants deemed necessary is added to the thin magnetic layer, then problems such as lubricant blooming under conditions of high temperature and high humidity become far more likely.

As a result, lubricants are added to, and held within the non-magnetic layer to become a lower layer of the magnetic layer. The lubricants within the non-magnetic layer are supplied gradually to the surface of the medium, depending on the environment in which the magnetic recording medium is used, and consequently the durability improves.

An example of a magnetic recording medium in which lubricants are added to the lower non-magnetic layer is detailed in Japanese Patent Laid-Open Publication No. Hei 10-334450 which discloses the lower non-magnetic layer contains acicular particles of hydrated iron oxide such as acicular goethite dispersed in a binder, wherein the acicular particles of hydrated iron oxide has the average long axial length of 0.2 μm or less and the average short axial length of 0.04 μm or less, and the lubricants for the lower non-magnetic layer utilize fatty acids and fatty acid esters.

SUMMARY OF THE INVENTION

A high recording density magnetic recording medium which uses an acicular powder of hydrated iron oxide in the lower non-magnetic layer, and has a high degree of surface smoothness and good durability is desired.

An object of the present invention is to provide a high recording density magnetic recording medium with excellent surface smoothness, as well as excellent electromagnetic conversion characteristics and durability.

As a result of intensive investigation based on the information described above, the inventors of the present invention discovered that by using a lower non-magnetic layer containing an acicular powder of hydrated iron oxide as a non-magnetic powder, and a fatty acid and a fatty acid amide as lubricants, a high recording density magnetic recording medium with excellent electromagnetic conversion characteristics and durability, and with ultra smooth magnetic layer surface which had proved extremely difficult to achieve with conventional techniques, could be obtained, and they were hence able to complete the present invention.

In other words, the present invention incorporates the following aspects.

(1) A magnetic recording medium comprising a lower non-magnetic layer containing at least a non-magnetic powder and a binder resin on a non-magnetic support, and an upper magnetic layer with a thickness of 0.2 μm or less on the lower non-magnetic layer, wherein the lower non-magnetic layer contains an acicular powder of hydrated iron oxide as the non-magnetic powder, and the lower non-magnetic layer contains a fatty acid and a fatty acid amide.

(2) The magnetic recording medium according to the aspect (1), wherein the acicular powder of hydrated iron oxide has an average long axial length of 0.15 μm or less.

(3) The magnetic recording medium according to the aspect (1) or (2), wherein the binder resin of the lower non-magnetic layer is a radiation curing type binder resin.

(4) The magnetic recording medium according to any one of the aspects (1) through (3), wherein the upper magnetic layer is provided on the lower non-magnetic layer following drying and curing of the lower non-magnetic layer.

(5) The magnetic recording medium according to any one of the aspects (1) through (4), wherein the upper magnetic layer has a surface roughness (center line average roughness: Ra) of 2.4 nm or less.

(6) The magnetic recording medium according to any one of the aspects (1) through (5), wherein the lower non-magnetic layer, prior to provision of the upper magnetic layer, has a surface roughness (center line average roughness: Ra) of 2.4 nm or less.

(7) The magnetic recording medium according to any one of the aspects (1) through (6), wherein the acicular powder of hydrated iron oxide is goethite.

(8) The magnetic recording medium according to any one of the aspects (1) through (7), wherein the fatty acid of the lower non-magnetic layer is at least one selected from the group consisting of stearic acid and palmitic acid, and the fatty acid amide is at least one selected from the group consisting of stearic acid amide and palmitic acid amide.

(9) The magnetic recording medium according to any one of aspects (1) through (8), wherein the lower non-magnetic layer further contains a fatty acid ester.

According to the present invention, a high recording density magnetic recording medium is provided which displays excellent electromagnetic conversion characteristics and durability, and has ultra smooth magnetic layer surface which has proved extremely difficult to achieve with conventional techniques.

DETAILED DESCRIPTION OF THE INVENTION

Now, the specific configurations of the present invention will be described in detail thereafter.

The magnetic recording medium of the present invention has at least two coating layers on one surface of a non-magnetic support, that is, a lower non-magnetic layer and an upper magnetic layer having a thickness of 0.2 μm or less formed in this order, and on the another surface of the non-magnetic support, a back coat layer is formed as required. Further, in the present invention, a lubricant coating layer, and/or various coating layers for protecting the magnetic layer may be formed on the upper magnetic layer as required. Also, on the surface of the non-magnetic support, on which the magnetic layer is to be formed, an undercoat layer (adhesion facilitating layer) may be formed for improving adhesion between the coating layer and the non-magnetic support.

[Lower Non-magnetic Layer]

In the present invention, in order to obtain a magnetic recording medium with an ultra smooth magnetic layer surface and excellent electromagnetic conversion characteristics and durability, it is extremely important that the lower non-magnetic layer to become a lower layer of the magnetic layer has a smooth surface and contains lubricants with superior lubricating action. In cases in which the magnetic layer is extremely thin, the surface roughness of the magnetic layer is affected by the surface roughness of the lower non-magnetic layer. In order to ensure a surface roughness (Ra) for the magnetic layer of 2.4 nm or less, the surface roughness (Ra) of the non-magnetic layer following curing but prior to the provision of the magnetic layer is preferably 2.4 nm or less, and even more preferably 2.1 nm or less. By ensuring that the surface roughness (Ra) of the non-magnetic layer is 2.4 nm or less, the surface roughness (Ra) of the upper magnetic layer can be controlled to a value of 2.4 nm or less. Consequently, in the present invention, the lower non-magnetic layer contains an acicular powder of hydrated iron oxide as the non-magnetic powder, as well as a fatty acid and a fatty acid amide as lubricants.

Examples of the acicular powder of hydrated iron oxide include acicular α-FeOOH (goethite), acicular β-FeOOH (akaganeite), and acicular γ-FeOOH (lepidocrocite), and of these, acicular goethite is preferred. Furthermore, mixtures of the above materials may also be used.

Goethite is an intermediate in the production of α-$Fe_2O_3$ (hematite), and hematite is produced by high temperature dehydration treatment of goethite. Accordingly, because the production of goethite does not require the same type of high temperature treatment used in the production of hematite, problems of inter-particle sintering do not arise, and the acicular goethite displays excellent dispersibility. Accordingly, the acicular powder of hydrated iron oxide displays excellent dispersibility.

In the present invention, because the non-magnetic layer contains an acicular powder of hydrated iron oxide with excellent dispersibility, the surface smoothness of the lower non-magnetic layer improves, and a strong coating is formed with the acicular particles overlapping in a mesh type network. The lower non-magnetic layer typically has the surface roughness (Ra) of 2.4 nm or less, and preferably within a range from 1.0 to 2.1 nm.

In addition, because an acicular powder of hydrated iron oxide displays a high adsorption of fatty acids, by using an acicular powder of hydrated iron oxide as the non-magnetic powder, a large quantity of fatty acids with an excellent lubricating effect can be added to the lower non-magnetic layer. Furthermore fatty acid amides, which also display an excellent lubricating effect, do not readily adsorb to inorganic pigments such as acicular powder of hydrated iron oxide or hematite, and consequently if no fatty acids are present, the addition of a large quantity of fatty acid amide would cause blooming from the medium. However, if fatty acids are present, then large quantities of fatty acid amides can be added to the lower non-magnetic layer. In other words, in the present invention, by using an acicular powder of hydrated iron oxide as the non-magnetic powder, large quantities of fatty acids can be added, and as a result, comparatively large quantities of fatty acid amides can be added. Accordingly, suitable and sufficient quantities of the fatty acids and the fatty acid amides can be supplied from the lower non-magnetic layer to the magnetic layer over an extended period of time, ensuring an excellent lubricating effect, and enabling an improvement in the durability of the medium.

The acicular powder of hydrated iron oxide preferably has the average long axial length of 0.15 μm or less, and is even more preferably within a range from 0.05 to 0.10 μm. If the average long axial length exceeds 0.15 μm, then the surface smoothness of the non-magnetic layer tends to deteriorate. At long axial length values of less than 0.05 μm, the dispersibility worsens, and as a result the surface smoothness of the non-magnetic layer tends to deteriorate.

In the present invention, the average long axial lengths of the ferromagnetic powder and the acicular powder of hydrated iron oxide may be determined by separating the ferromagnetic powder and the acicular powder of hydrated iron oxide from a tape fragment, extracting a sample of each material, and then measuring the long axial length of each powder from a photograph taken using a transmission type electron microscope (TEM). An example of the sequence involved in such a measurement is described below. (1) Using a solvent, the back coat layer is wiped and removed from a tape fragment. (2) The remaining tape fragment sample, comprising the lower non-magnetic layer and the upper magnetic layer formed on the non-magnetic support, is placed in a 5% NaOH solution and then heated and stirred. (3) The coating films removed from the non-magnetic support are washed in water and dried. (4) The removed coating films are treated with ultrasound in methyl ethyl ketone (MEK), and then a magnet stirrer is used to adsorb and collect the ferromagnetic powder. (5) The acicular powder of hydrated iron oxide is separated from the residue and dried. (6) Using a special mesh, a sample is taken from each of the powders obtained in (4) and (5) to prepare TEM samples, and these acicular powders are then photographed using TEM. (7) The long axial length of the acicular powder in each photograph is measured and averaged (n=100).

The quantity of the acicular powder of hydrated iron oxide is from 40 to 80% by weight, and preferably from 45 to 75% by weight of the lower non-magnetic layer. At quantities less than 40% by weight, holding the desired quantity of lubricant becomes difficult. In contrast, if 80% by weight is used then a satisfactory quantity of lubricant can be held. If quantities exceeding 80% by weight are used then the proportion of the binder resin in the lower non-magnetic layer falls too far and a satisfactory coating film strength cannot be achieved.

The lower non-magnetic layer contains carbon black. The carbon black has a function of holding the lubricant. However, in comparison with the acicular powder of hydrated iron oxide described above, this holding action is very small. Also, the carbon black of the lower non-magnetic layer has an effect to lower the surface electric resistance of the upper magnetic layer as well as an effect to reduce the light transmittance.

Examples of carbon black contained in the non-magnetic layer include furnace black for rubber, thermal black for rubber, black for color, acetylene black, etc. Preferably the carbon black has a BET specific surface area of 5 to 600 $m^2/g$, a DBP oil absorption of 30 to 400 mL/100 g, and a particle size of 10 to 100 nm. The carbon black which may be used may be referred specifically to "Carbon Black Almanac," compiled by the Society of Carbon Black.

In addition to the acicular powder of hydrated iron oxide and carbon black, the non-magnetic layer may also contain as appropriate a variety of inorganic powders, provided that the inclusion of such powders does not impair the effects of the present invention. Examples of such inorganic powders include non-magnetic powders such as non-magnetic iron oxide (hematite), calcium carbonate, titanium oxide, barium sulfate, and aluminum oxide ($\alpha$-$Al_2O_3$).

The quantity of carbon black is from 5 to 40% by weight, and preferably from 7 to 35% by weight of the lower non-magnetic layer. In the present invention, because the acicular powder of hydrated iron oxide, and preferably acicular goethite, holds the lubricants, the carbon black content may be held to a value within the above range.

In the present invention, the lower non-magnetic layer contains fatty acids and fatty acid amides as lubricants. Fatty acids and fatty acid amides may individually be used known ones either alone or in mixtures of two or more. The use of a mixture of two or more fatty acids with different melting points, or a mixture of two or more fatty acid amides with different melting points is also preferred. The reason for this preference is that lubricants which correspond with all temperature environment in which the medium is being used need to be supplied continuously to the surface of the medium. Furthermore, in addition to the use of fatty acids and fatty acid amides, known fatty acid esters and saccharides may also be used as lubricants optionally.

Specifically, in the case of fatty acids, saturated straight chain fatty acids such as stearic acid, palmitic acid, myristic acid, lauric acid, and erucic acid; saturated fatty acids with side chains such as isocetylic acid, and isostearic acid; and unsaturated fatty acids such as oleic acid, linoleic acid, and linolenic acid may be used as appropriate. Of these, from the viewpoints of improving tape running and limiting blooming from the medium surface, stearic acid is preferred. Combinations of stearic acid and palmitic acid are also desirable. The fatty acids such as stearic acid, palmitic acid, and myristic acid are difficult to obtain industrially as high purity materials, and often contain other fatty acids with different numbers of carbon atoms as impurities.

Examples of the fatty acid amides include the amides of the fatty acids described above, and more specifically, stearic acid amide, palmitic acid amide, myristic acid amide, lauric acid amide, erucic acid amide, isocetylic acid amide, isostearic acid amide, oleic acid amide, linoleic acid amide, and linolenic acid amide may be used as appropriate. Of these, from the viewpoints of improving tape running and limiting blooming from the medium surface, stearic acid amide is preferred. Combinations of stearic acid amide and palmitic acid amide are also desirable. The fatty acid amides such as stearic acid amide, palmitic acid amide, and myristic acid amide are difficult to obtain industrially as high purity materials, and often contain other fatty acid amides with different numbers of carbon atoms as impurities.

In the present invention, if the lower non-magnetic layer also contains a liquid lubricant type fatty acid ester in addition to the fatty acid and the fatty acid amide, then low temperature running can be improved, and the ester also has a carrier effect on the fatty acid and the fatty acid amide, thereby favorably improving the lubricating effect. Of the possible fatty acid esters, from the viewpoints of improving the tape running and limiting blooming from the medium surface, stearate esters are preferred. Combinations of stearate esters and palmitate esters are also desirable. The fatty acid esters such as stearate esters, palmitate esters, and myristate esters are difficult to obtain industrially as high purity materials, and often contain other fatty acid esters with different numbers of carbon atoms as impurities.

Examples of the fatty acid esters include straight chain saturated fatty acid esters such as butyl stearate and butyl palmitate; saturated fatty acid esters with side chains such as isocetyl stearate and isostearyl stearate; unsaturated fatty acid esters such as isostearyl oleate; fatty acid esters of unsaturated alcohols such as oleyl stearate; esters of an unsaturated fatty acid and an unsaturated alcohol such as oleyl oleate; esters of bivalent alcohols such as ethylene glycol distearate; esters of a bivalent alcohol and an unsaturated fatty acid such as ethylene glycol monooleate, ethylene glycol dioleate, and neopentyl glycol dioleate; and esters of a saccharide and a saturated or unsaturated fatty acid such as sorbitan monostearate, sorbitan tristearate, sorbitan monooleate, and sorbitan trioleate.

The quantity of lubricant in the lower non-magnetic layer may be suitably adjusted in accordance with the intended effect, although with respect to 100 parts by weight of the acicular powder of hydrated iron oxide, 0.8 to 4 parts by weight of fatty acid are preferred, and 0.4 to 2 parts by weight of fatty acid amide are preferred. If large quantities of fatty acid are used relative to the quantity of the acicular powder of hydrated iron oxide, then problems of blooming from the medium surface become more likely. If too large quantities of fatty acid amide are used relative to the quantity of fatty acid, then problems of blooming from the medium surface become more likely. Furthermore, when fatty acid esters are used, the quantity of the ester is preferably within a range from 0.5 to 4 parts by weight with respect to 100 parts by weight of the acicular powder of hydrated iron oxide. If overly large quantities of fatty acid ester are used relative to the quantity of the acicular powder of hydrated iron oxide, then problems of blooming from the medium surface become more likely.

In the present invention, the binder resin for the non-magnetic layer may utilize a reactive heat curing type binder resin, although use of a radiation curing type binder resin is extremely effective as it enables cross linking of the binder resin to be increased significantly.

Examples of the radiation curing type binder resin used in the present invention are resins with at least one unsaturated double bond within the molecular chain, which undergo curing by generating radicals through irradiation, leading to cross linking or polymerization.

Examples of radiation curing type binder resin include vinyl chloride type resin, polyurethane resin, polyester resin, epoxy type resin, phenoxy resin, fiber type resin, polyether type resin, polyvinyl alcohol type resin, and many other resins. Of these, vinyl chloride type resin and polyurethane resin are typical, and it is preferable to use the both in combination.

The radiation curing vinyl chloride type resin is synthesized according to known methods by modifying a vinyl chloride type resin as raw material to radiation functional type resin. For the vinyl chloride type resin as raw material, the vinyl chloride type resin of which vinyl chloride content is 60 to 100% by weight, and preferably 60 to 95% by weight in particular. Examples of such vinyl chloride type resin include vinyl chloride-vinyl acetate-vinyl alcohol copolymer, vinyl chloride-hydroxyalkyl (meth)acrylate copolymer, vinyl chloride-vinyl acetate-maleic acid copolymer, vinyl chloride-vinyl acetate-vinyl alcohol-maleic acid copolymer, vinyl chloride-hydroxyalkyl (meth)acrylate-maleic acid copolymer, vinyl chloride-vinyl acetate-vinyl alcohol-glycidyl (meth)acrylate copolymer, vinyl chloride-hydroxyalkyl (meth)acrylate-glycidyl (meth) acrylate copolymer, vinyl chloride-hydroxyalkyl (meth)acrylate-allyl glycidyl ether copolymer, vinyl chloride-vinyl acetate-vinyl alcohol-allyl glycidyl ether copolymer, and the like. Especially, a copolymer of vinyl chloride and a monomer which contains epoxy(glycidyl) group is preferable. And, the average polymerization degree of the copolymer is preferably 100 to 900, and more preferably 100 to 600.

Furthermore, in order to improve dispersibility, it is preferable to introduce polar groups such as $—SO_4M$, $—SO_3M$, $—POM$, $—PO_2M$, $—PO_3M$, $—COOM$ (M represents H or alkaline metal), $—SR$, $—NR_2$, $—N^+R_3Cl^-$ (R represents H or hydrocarbon group), phosphobetaine, sulfobetaine, phosphamine, sulfamine, and the like into the copolymer by optional methods as required. Also, to improve heat stability, an introduction of epoxy group is preferable.

The radiation curing polyurethane resin (polyurethane acrylate resin) is generally obtained by a reaction of a resin containing hydroxy group and an acrylic type compound containing hydroxyl group and a compound containing polyisocyanate.

Examples of the resin containing hydroxy group include polyalkylene glycols such as polyethylene glycol, polybutylene glycol, polypropylene glycol, and the like, alkylene oxide adduct of bisphenol A, polyether polyols which has various kinds of glycols and hydroxyl groups at the terminal of the molecular chain. Of these, a polyurethane acrylate resin obtained by using polyether polyol as one component is preferable.

Examples of carboxylic acid component of polyether polyol include aromatic dicarboxylic acids such as terephthalic acid, isophthalic acid, orthophthalic acid, 1,5-naphthalic acid, and the like, aromatic oxycarboxylic acids such as p-oxybenzoic acid, p-(hydroxyethoxy)benzoic acid, and the like, aliphatic dicarboxylic acids such as succinic acid, adipic acid, azelaic acid, sebacic acid, dodecanoic dicarboxylic acid, and the like, unsaturated aliphatic acids and alicyclic dicarboxylic acids such as fumaric acid, maleic acid, itaconic acid, tetrahydrophthalic acid, hexahydrophthalic acid, and the like, tri- or tetra-carboxylic acids such as trimellitic acid, trimesic acid, pyromellitic acid, and the like.

Examples of glycol component of the polyether polyol include ethylene glycol, propylene glycol, 1,3-propanediol, 1,4-butanediol, 1,5-pentanediol, 1,6-hexanediol, neopentyl glycol, diethylene glycol, diproylene glycol, 2,2,4-trimethyl-1,3-pentanediol, 1,4-cyclohexanedimethanol, ethylene oxide adducts and propylene oxide adducts of bisphenol A, etc., ethylene oxide and propylene oxide adduct of hydrogenated bisphenol A, polyethylene glycol, polypropylene glycol, polytetramethylene glycol, and the like. Also, tri- or tetra-ols such as trimethylolethane, trimetylolpropane, glycerin, pentaerythritol, and the like may be used in combination.

Examples of polyether polyol include, in addition to the examples mentioned above, lactone type polyesterdiol chain obtained by ring opening polymerization of lactone such as caprolactone.

Examples of polyisocyanate used include diisocyanate compounds such as 2,4-tolylene diisocyanate, 2,6-tolylene diisocyanate, p-phenylene diisocyanate, biphenylmethane diisocyanate, m-phenylene diisocyanate, hexamethylene diisocyanate, tetramethylene diisocyanate, 3,3'-dimethoxy-4,4'-biphenylene diisocyanate, 2,4-naphthalene diisocyanate, 3,3'-demethyl-4,4'-biphenylene diisocyanate, 4,4'-diphenylene diisocyanate, 4,4'-diisocyanate-diphenyl ether, 1,5-naphthalene diisocyanate, p-xylylene diisocyanate, m-xylylene diisocyanate, 1,3-diisocyanate methylcyclohexane, 1,4-isocyanate methylcyclohexane, 4,4'-diisocyanate dicyclohexane, 4,4'-diisocyanate cyclohexylmethane, isophorone diisocyanate, and the like, or triisocyanate compounds such as 2,4-tolylene diisocyanate-trimer, hexamethylene diisocyanate-trimer of 7 or lower mol % in all isocyanate groups, and the like.

Furthermore, in order to improve dispersibility, it is preferable to introduce polar groups such as $—SO_4M$, $—SO_3M$, $—POM$, $—PO_2M$, $—PO_3M$, $—COOM$ (M represents H or alkaline metal), $—SR$, $—NR_2$, $—N^+R_3Cl^-$ (R represents H or hydrocarbon group), phosphobetaine, sulfobetaine, phosphamine, sulfamine, and the like into the copolymer by optional methods as required. Also, to improve heat stability, an introduction of epoxy group is preferable.

On the other hand, apart from the above synthetic method of the radiation curing type urethane, modification of reactive thermosetting type polyurethane resin as raw material to radiation functional type resin may be carried out, by using hydroxyl group thereof in a known method.

Also, a radiation curing type monomer or an oligomer may be used as required, and the use of them enables the coating layer to have a higher crosslinking degree. The additional content is preferably 30 parts by weight or less, and more preferably 20 parts by weight or less with respect to the resin contained in the lower non-magnetic layer coating material. When the content exceeds 30 parts by weight, the coating material is given a strong influence and this conversely results in a lower gloss. The radiation curing type monomer or oligomer may be added either after preparing the coating material or the time of dispersing.

The coating material for forming the non-magnetic layer is prepared by adding an organic solvent to the above-mentioned components. There is no particular limit to the organic solvent used, and one or two kinds or more of various solvents such as ketone type solvents such as methyl ethyl ketone (MEK), methyl isobutyl ketone, cyclohexanone, etc., or aromatic type solvents such as toluene, etc. may be suitably chosen and used. The amount of organic solvent added may be about 100 to 900 parts by weight with respect to 100 parts by weight of a total amount of solids (carbon black and various inorganic powders, etc.) and the binder.

When the radiation curing type binder resin is used for the non-magnetic layer in the present invention, radiation is irradiated to effect cross-linking in the coating layer. Examples of radiation used include the electron beam, γ ray, β ray, ultraviolet ray, etc., and the preferable one is the electron beam. The irradiation dose is preferably 1 to 10 Mrad and more preferably 3 to 7 Mrad. The irradiation energy (acceleration voltage) is preferably 100 kV or more. The radiation is preferably irradiated before winding after coating and drying, but it may be irradiated after winding.

[Upper Magnetic Layer]

In the present invention, the magnetic layer contains a ferromagnetic powder and a binder resin.

The ferromagnetic powder may utilize known materials, including fine oxide powders such as $\gamma\text{-}Fe_2O_3$ (maghemite), Co containing $\gamma\text{-}Fe_2O_3$, $Fe_3O_4$ (magnetite), Co containing $Fe_3O_4$, $CrO_2$, $BaOFe_2O_3$ (barium ferrite), and $SrOFe_2O_3$ (strontium ferrite), as well as fine metal powders of metals such as Fe, Co, Ni, or alloys of these metals.

These ferromagnetic powders may be selected in accordance with factors such as the type of medium, although of the above powders, fine powders of metals such as Fe, Co and Ni, or alloys of these metals, are preferred. Powders containing rare earth elements such as Y as a doping element are also preferred. The coercive force of the powder may be appropriately matched to either existing drive systems or drive systems currently under development.

Examples of the binder resins for the magnetic layer include thermoplastic resins, heat curing or reactive heat curing type resins, and electron beam sensitive modified resins, and combinations of these resins may also be used in accordance with the characteristics of the medium and the process conditions.

Furthermore, dispersants such as surfactants, lubricants such as higher fatty acids, fatty acid esters and silicone oil, and various other additives may also be added to the magnetic layer where necessary.

The coating material for forming the magnetic layer is prepared by adding an organic solvent to each of the components described above. There are no particular restrictions on the organic solvent used, and the same solvents as those described for the non-magnetic layer may be used.

The thickness of the magnetic layer is 0.20 µm or less, and is preferably within a range from 0.03 to 0.20 µm, and even more preferably from 0.03 to 0.15 µm. If the magnetic layer is too thick then self-demagnetizing loss and thickness loss increase. In cases where a high sensitivity MR head is used, thinner magnetic layers are preferred.

In order to be a high recording density medium, the surface roughness (Ra) of the magnetic layer is 2.4 nm or less, preferably 2.1 nm or less. If the surface roughness (Ra) of the magnetic layer exceeds 2.4 nm, the roughness of the surface causes an increase in medium noise, resulting in a worse error rate. In relation to the electromagnetic conversion characteristics, the smaller the surface roughness becomes the better, but if the surface roughness (Ra) falls below 1.0 nm, then the friction between the head and the tape increases, which may cause a reduction in the durability. Accordingly, surface roughness (Ra) values for the magnetic layer within a range from 1.0 to 2.1 nm are particularly preferred.

[Back Coat Layer]

in the case of magnetic tape, back-coat layer is provided on the opposite surface of the non-magnetic support to the non-magnetic layer and the magnetic layer. The back coat layer is provided for improving the running stability and preventing electrification of the magnetic layer, etc. The back-coat layer preferably contains 30 to 80% by weight of carbon black. When the carbon black content is excessively small, the electrification preventing effect tends to lower, and in addition, the running stability tends to lower. Also the light transmittance of the medium tends to increase, and thereby problems occur in the system for detecting the tape end by the change of light transmittance. On the other hand, when the carbon black content is excessively large, the strength of the back-coat layer lowers, and the running durability tends to degrade. Any kind of carbon black may be used if it is used in general, and the average particle size is preferably about 5 to 500 nm.

The binder resin used in the back coat layer may utilize the same binder resins described above for the magnetic layer.

The coating material for forming the back coat layer is prepared by adding an organic solvent to each of the components described above. There are no particular restrictions on the organic solvent used, and the same solvents as those described for the non-magnetic layer may be used.

[Production of a Magnetic Recording Medium]

In the present invention, a magnetic recording medium is prepared by forming the non-magnetic layer and the magnetic layer using a wet-on-dry application system. In other words, first, the non-magnetic layer coating material is applied to one surface of the non-magnetic support, dried, subjected to calendering, and then cured to form the lower non-magnetic layer. Subsequently, the magnetic layer coating material is applied to the cured lower non-magnetic layer and then dried to form the upper magnetic layer. Next, the back coat layer coating material is applied to the opposite surface of the non-magnetic support, and then dried to form the back coat layer. Subsequently, heat curing is performed to cure the upper magnetic layer and the back coat layer. Preferably by performing calendering of the lower non-magnetic layer prior to the application and formation of the upper magnetic layer, a smoother magnetic layer surface can be achieved.

In terms of calendering of the upper magnetic layer and the back coat layer, the upper magnetic layer may be subjected to calendering following application and drying of the magnetic layer coating material, and the back coat layer may be subjected to calendering following application and drying of the back coat layer coating material. Alternatively, the magnetic layer coating material may be applied and dried, the back coat layer coating material then applied and dried, and calendering of both the upper magnetic layer and the back coat layer surfaces then performed.

Furthermore, in the present invention, the sequence of the steps for forming the lower non-magnetic layer, forming the upper magnetic layer, and forming the back coat layer typically preferably involves formation of the lower non-magnetic layer, followed by formation of the upper magnetic layer, and then formation of the back coat layer as aforementioned process. However, the back coat layer may also be formed first, followed by formation of the lower non-magnetic layer and the upper magnetic layer. Alternatively, the lower non-magnetic layer may be formed first, followed by formation of the back coat layer and then the upper magnetic layer.

In addition, in the present invention the upper magnetic layer may also be applied, formed and then subjected to heat curing to cure the upper magnetic layer before the back coat layer is applied, formed and heat cured.

By using a wet-on-dry application system, the type of interface disturbance between the non-magnetic layer and the magnetic layer seen in wet-on-wet application systems, where the magnetic layer is applied while the non-magnetic layer is still wet, does not occur. In the present invention, because the non-magnetic layer coating material contains an acicular powder of hydrated iron oxide with excellent dispersibility, the surface smoothness of the lower non-magnetic layer improves, the coating film becomes less susceptible to transfer from the back coat layer during heat curing in the production process, and during storage in a high temperature, high humidity environment following production. As a result of these factors, the magnetic layer with excellent electromagnetic conversion characteristics can be obtained.

The application method may utilize any of a variety of known application techniques including gravure coating, reverse roll coating, die nozzle coating, and bar coating.

As follows is a description of the calendering treatment used as a surface smoothing treatment in the steps for forming the lower non-magnetic layer, the upper magnetic layer, and the back coat layer. For the calendering roll, a combination of heat-resistant plastic rolls such as epoxy, polyester, nylon, polyimide, polyamide, polyimideamide, etc. (rolls with carbon, metal, or other inorganic compounds kneaded may be used) and metal rolls (three to seven-high combination) are used. Also, a combination of metal rolls only may be used. The treatment temperature is preferably 70° C. or higher, and more preferably 90° C. or higher. The linear pressure is preferably $1.9 \times 10^5$ N/m (200 kg/cm) or higher, and more preferably $2.4 \times 10^5$ N/m (250 kg/cm) or higher, and the treatment speed is in the range from 20 m/min to 900 m/min.

EXAMPLES

As follows is a more detailed description of the present invention based on a series of examples, although the invention is in no way limited to the examples presented.

Evaluations of the characteristics of magnetic recording media in the examples were conducted in accordance with the following standards.

(Surface Roughness: Ra)

Ra measurements were conducted using a TALYSTEP system (manufactured by Taylor Hobson Co., Ltd.) in accordance with JIS B0601.

Surface roughness of a non-magnetic layer was measured by sampling from a roll prepared by applying a non-magnetic layer to a non-magnetic support, drying and calendering, and then irradiating with an electron beam.

Measurement conditions used include filtering of 0.18 to 9 Hz, a 0.1×2.5 μm stylus, a stylus pressure of 2 mg, a measurement speed of 0.03 mm/sec, and a measurement length of 500 μm.

(Electromagnetic Conversion Characteristics)

Using a MS4500 manufactured by MEDIASCOPE International Inc., and a C5683A drive manufactured by Hewlett Packard Corporation, the 20 MHz (recording wavelength 0.67 μm) output (μV) at a recording current of 30 mA was measured, and the output ratio relative to a reference tape was determined as a dB value.

(Durability)

Evaluations of tape durability were conducted using a C5683A drive manufactured by Hewlett Packard Corporation. The durability evaluation involved conducting 6000 passes across a section of the tape using a write/read method. Evaluations were conducted by the number of passes completed and the number of passes at the point where errors began to increase.

In Table 1, on the number of passes, representation recorded as >6000 expresses those samples for which drive stoppage problems had not occurred after 6000 passes. In those cases in which a specific number is recorded, this number refers to the number of passes at the point the drive stopped.

(Blooming)

The tape was stored for 5 days in a room temperature environment, and the surface of the tape was then inspected under a microscope to ascertain whether or not any lubricant blooming had occurred.

Furthermore, the tape was also stored for 5 days in a thermostatic chamber set to a high temperature, high humidity (50° C., 80% RH) environment, and the surface of the tape was then inspected under a microscope to ascertain whether or not any lubricant blooming had occurred.

Example 1

A magnetic recording medium was prepared in the manner described below.

| (Non-magnetic layer coating material) | |
| --- | --- |
| Non-magnetic powder: | |
| acicular goethite | 80 parts by weight |
| (BET specific surface area: 63 m²/g, long axial length: 0.1 μm, crystalline diameter: 13 nm, pH: 8.5) | |
| carbon black | 20 parts by weight |
| (manufactured by Mitsubishi Chemical Corporation, #950B) (particle size: 17 nm, BET value: 250 m²/g, DBP oil absorption: 70 ml/100 g, pH: 8) | |
| Resin: | |
| vinyl chloride type resin | 11 parts by weight |
| (manufactured by Toyobo Co., Ltd., TB-0246) | (solid fraction) |
| (a copolymer of vinyl chloride and an epoxy containing monomer, average degree of polymerization: 310, epoxy content: 3% (mass percent), potassium persulfate used. S content: 0.6% (mass percent), MR110 manufactured by Zeon Corporation was acrylic modified, using 2-isocyanate ethyl-methacrylate (MOI), acrylic content: 6 mol/1 mol) | |
| polyurethane resin | 9 parts by weight |
| (manufactured by Toyobo Co., Ltd., TB-0216) (hydroxy-containing acrylic compound-phosphonic acid group containing phosphorus compound-hydroxy-containing polyester polyol, average molecular weight Mn: 13,000, P content: 0.2% (mass percent), dissolved in a MEK/toluene = 1/1 (weight ratio) mixed solvent (solid fraction concentration: 35% (mass percent), acrylic content: 8 mol/1 mol) | |
| Dispersant: | |
| RE610 manufactured by Toho Chemical Industry Co., Ltd. | 1.2 parts by weight |
| phenylphosphonic acid | 2 parts by weight |
| Abrasive: | |
| α-alumina | 4 parts by weight |
| (HIT60A, manufactured by Sumitomo Chemical Co., Ltd., average particle size: 0.20 μm) | |
| Lubricant: | |
| stearic acid: NAA180, manufactured by NOF Corporation | 2 parts by weight |
| fatty acid amide: Fatty acid amide S. manufactured by Kao Corporation | 1 part by weight |
| (stearic acid amide 66%, palmitic acid amide 30%) | |

-continued (Non-magnetic layer coating material)

| | |
|---|---|
| butyl stearate: Butyl stearate S, manufactured by Nippon fine Chemical Co., Ltd. | 1 part by weight |

NV (solid fraction consentration)=20% (mass percent)
Solvent ratio: MEK/toluene/cyclohexane=2/2/1 (weight ratio)

The components listed above were kneaded together in a kneader and then dispersed using a horizontal pin mill 80% filled with zirconia beads of diameter 0.8 mm (void fraction 50 vol %), and finally, the lubricants and the solvents were added and the viscosity was adjusted, yielding a non-magnetic layer coating material.

(Magnetic layer coating material)

| | |
|---|---|
| Ferromagnetic powder: Fe type acicular magnetic powder (containing 24 at % of Co relative to Fe, Al = 5/(Fe + Co) wt %, Y = 8/(Fe + Co) at %, Hc: 194 kA/m, σs: 140 Am$^2$/kg, BET value: 56 m$^2$/g, long axial length: 0.075 μm, crystalline diameter: 13 nm, pH: 9.4) Resin: | 100 parts by weight |
| vinyl chloride type copolymer (MR110, manufactured by Nippon Zeon Corporation) (vinyl chloride/2-HEMA/AGE/molecular terminal —OSO$_3$K = 84.5/4.5/7.4/0.36) | 14 parts by weight |
| polyester polyurethane resin (UR8200, manufactured by Toyobo Co., Ltd.) (containing —SO$_3$Na groups, average molecular weight Mn: 20,000) Dispersant: | 2 parts by weight |
| organic phosphoric acid compound (RE610, manufactured by Toho Chemical Industry Co., Ltd.) Abrasive: | 3 parts by weight |
| aluminum oxide (HIT82, manufactured by Sumitomo Chemical Co., Ltd., average particle size: 0.12 μm) Lubricant: | 4 parts by weight |
| stearic acid: NAA180, manufactured by NOF Corporation | 1.2 parts by weight |
| butyl stearate: Butyl stearate-S manufactured by Nippon Fine Chemical Co., Ltd. | 1 part by weight |
| Curing agent: C-3041, manufactured by Nippon Polyurethane Industry Co., Ltd. NV = 16% Solvent ratio: MEK/toluene/cyclohexane = 1/1/3 (weight ratio) The components listed above were kneaded together in a kneader, dispersed using a horizontal pin mill, and the viscosity was finally adjusted, yielding a magnetic layer coating material. | 4 parts by weight |

(Back coat layer coating material)

| | |
|---|---|
| carbon black BP-800, manufactured by Showa Cabot Co., Ltd. (average particle size: 17 nm, DBP oil absorption: 68 ml/100 g, BET specific surface area: 210 m$^2$/g) | 75 parts by weight |
| carbon black BP-130, manufactured by Showa Cabot Co., Ltd. (average particle size: 75 nm, DBP oil absorption: 69 ml/100 g, BET specific surface area: 25 m$^2$/g) | 10 parts by weight |
| calcium carbonate Homocal D, manufactured by Shiraishi Group | 15 parts by weight |
| (average particle size: 70 nm) Resin: | |
| nitrocellulose (BTH1/2, manufactured by Asahi Kasei Corporation) | 55 parts by weight |
| polyurethane (UR-8700, manufactured by Toyobo Co., Ltd.) | 35 parts by weight |
| Curing agent: C-3041, manufactured by Nippon Polyurethane Industry Co., Ltd. NV = 11.5% Solvent ratio: MEK/toluene/cyclohexane = 53/40/7 (weight ratio) | 4 parts by weight |

The components listed above were kneaded together in a kneader, subsequently dispersed using a side grind mill, and the viscosity was finally adjusted, yielding a back coat layer coating material.

(Preparation of a Magnetic Tape Sample)

The non-magnetic layer coating material was applied to one surface of a polyamide support having a thickness of 4.4 μm with a nozzle coater, so as to produce a thickness following calendering of 0.7 μm, and this material was then dried. Subsequently, the material was subjected to calendering treatment, and was then irradiated with 4.5 Mrad using an electron beam to cure the material, thereby forming a non-magnetic layer. The surface roughness (Ra) of the non-magnetic layer at this point was 2.0 nm.

The magnetic layer coating material was then applied to the formed non-magnetic layer with a nozzle coater, so as to produce a thickness following calendering of 0.15 μm, and the material was oriented, dried and subjected to calendering treatment. In addition, the back coat layer coating material was applied to the opposite surface of the polyamide support with a nozzle coater, so as to produce a dried thickness of 0.5 μm, and the material was then dried and subjected to calendering treatment. The surface roughness (Ra) of the magnetic layer at this point was 2.0 nm.

The tape original prepared in this manner was then subjected to heat curing at 60° C. for 48 hours. The surface roughness (Ra) of the magnetic layer following heat curing was 2.0 nm. Subsequently, the tape was cut into strips of width 3.8 mm to prepare DDS4 tapes of the example 1. The surface roughness (Ra) of the magnetic layer of the tapes at this point was 2.0 nm.

Examples 2, 3, 8

As shown in Table 1, with the exception of altering the acicular goethite of the non-magnetic layer coating material of the example 1 to a material with a different long axial length, magnetic tape samples were prepared in the same manner as the example 1.

Examples 4, 5

As shown in Table 1, with the exceptions of altering either the quantity of the fatty acid amide (example 4) or the quantities of both the fatty acid and the fatty acid amide (example 5) in the non-magnetic layer coating material of the example 1, magnetic tape samples were prepared in the same manner as the example 1.

Example 6

With the exception of using 1 part by weight of a high purity stearic acid amide of at least 94 wt % as the fatty acid amide in the non-magnetic layer coating material of the example 1, a magnetic tape sample was prepared in the same manner as the example 1.

Example 7

With the exception of using 1 part by weight of a high purity palmitic acid amide of at least 94 wt % as the fatty acid amide in the non-magnetic layer coating material of the example 1, a magnetic tape sample was prepared in the same manner as the example 1.

Comparative Examples 1 to 4

As shown in Table 1, with the exceptions of using acicular hematite for the non-magnetic powder in the non-magnetic layer coating material of the example 1, and altering the quantities of fatty acid and fatty acid amide added as lubricants, magnetic tape samples were prepared in the same manner as the example 1.

Comparative Examples 5, 6

As shown in Table 1, with the exceptions of either adding no fatty acid and altering the quantity of the fatty acid amide (comparative example 5), or adding no fatty acid amide (comparative example 6), magnetic tape samples were prepared in the same manner as the example 1.

The values for the surface roughness (Ra) of the magnetic layer shown in Table 1 refer to the surface roughness following heat curing.

From Table 1 it is evident that all of the samples from examples 1 through 7 have a high output, excellent durability, and show no surface blooming of lubricants even after storage in a high temperature, high humidity environment. The sample from the example 3 was particularly superior with a very high output. The samples of the examples 1 through 7 displayed superior surface roughness values to that of the example 8 which used acicular goethite with a longer long axial length.

What is claimed is:

1. A magnetic recording medium comprising a lower non-magnetic layer containing at least a non-magnetic powder and a binder resin on a non-magnetic support, and an upper magnetic layer with a thickness of 0.2 μm or less on said lower non-magnetic layer, wherein said lower non-magnetic layer contains an acicular powder of hydrated iron oxide as the non-magnetic powder of a quantity in a range of approximately 40% to 80% by weight of the lower non-magnetic layer, and said lower non-magnetic layer contains a fatty acid and a fatty acid amide, a quantity of the fatty acid by weight being in an approximate range of 0.8 to 4.0 parts relative to 100 parts by weight of the acicular powder of hydrated iron oxide and a quantity of the fatty acid amide by weight being in an approximate range of 0.4

TABLE 1

| | Non-magnetic layer | | | | Durability | | | Existence of blooming | | | | |
| | Non-magnetic inorganic powder | | Lubricants | | | | | | After storage at room temperature | After storage at high temperature high humidity | Non-magnetic layer surface roughness Ra (nm) | Magnetic layer surface roughness Ra (nm) | Output (dB) |
| | Type | Long axial length (μm) | Fatty acid (parts by weight) | Fatty acid amide (parts by weight) | Number of passes | Error increase | Start of error increase (pass number) | | | | | |
|---|---|---|---|---|---|---|---|---|---|---|---|---|
| Example 1 | acicular goethite | 0.10 | 2.0 | 1.0 | >6000 | no | — | no | no | 2.0 | 2.0 | 0.7 |
| Example 2 | acicular goethite | 0.15 | 2.0 | 1.0 | >6000 | no | — | no | no | 2.3 | 2.3 | 0.4 |
| Example 3 | acicular goethite | 0.05 | 2.0 | 1.0 | >6000 | no | — | no | no | 1.7 | 1.7 | 1.0 |
| Example 4 | acicular goethite | 0.10 | 2.0 | 0.4 | >6000 | yes | 5500 | no | no | 2.0 | 2.0 | 0.7 |
| Example 5 | acicular goethite | 0.10 | 0.8 | 0.6 | >6000 | yes | 5500 | no | no | 2.0 | 2.0 | 0.7 |
| Example 6 | acicular goethite | 0.10 | 2.0 | 1.0 | >6000 | no | — | no | no | 2.0 | 2.0 | 0.7 |
| Example 7 | acicular goethite | 0.10 | 2.0 | 1.0 | >6000 | no | — | no | no | 2.0 | 2.0 | 0.7 |
| Example 8 | acicular goethite | 0.20 | 2.0 | 1.0 | >6000 | no | — | no | no | 2.4 | 2.4 | 0.2 |
| Comparative example 1 | acicular hematite | 0.10 | 0.6 | 0.4 | 3000 | yes | 1500 | no | no | 2.5 | 2.6 | 0.0 |
| Comparative example 2 | acicular hematite | 0.10 | 0.6 | 0.6 | 4500 | yes | 3500 | no | yes | 2.5 | 2.6 | 0.0 |
| Comparative example 3 | acicular hematite | 0.10 | 0.8 | 0.4 | 4000 | yes | 3000 | no | yes | 2.5 | 2.6 | 0.0 |
| Comparative example 4 | acicular hematite | 0.10 | 0.8 | 0.6 | — | — | — | yes | yes | 2.5 | 2.6 | 0.0 |
| Comparative example 5 | acicular goethite | 0.10 | 0.0 | 0.6 | — | — | — | yes | yes | 2.0 | 2.0 | — |
| Comparative example 6 | acicular goethite | 0.10 | 2.0 | 0.0 | 5000 | yes | 4000 | no | no | 2.0 | 2.0 | 0.7 | to 2.0 parts relative to 100 parts by weight of the acicular powder of hydrated iron oxide.

2. The magnetic recording medium according to claim 1, wherein said acicular powder of hydrated iron oxide has an average long axial length of 0.15 μm or less.

3. The magnetic recording medium according to claim 1, wherein said binder resin of said lower non-magnetic layer is a radiation curing binder resin.

4. The magnetic recording medium according to claim 1, wherein the acicular powder of hydrated iron oxide is substantially acicular goethite.

5. The magnetic recording medium according to claim 4, wherein the acicular goethite has an average long axial length of 0.20 μm or less.

* * * * *